US012173198B2

(12) United States Patent
Thomas

(10) Patent No.: US 12,173,198 B2
(45) Date of Patent: Dec. 24, 2024

(54) BIODEGRADABLE ADHESIVES

(71) Applicant: BIO-BOND LLC, Peosta, IA (US)

(72) Inventor: Richard W. Thomas, Las Vegas, NV (US)

(73) Assignee: BIO-BOND LLC, Peosta, IA (US)

( * ) Notice: Subject to any disclaimer, the term of this patent is extended or adjusted under 35 U.S.C. 154(b) by 639 days.

(21) Appl. No.: 17/428,199

(22) PCT Filed: Feb. 5, 2020

(86) PCT No.: PCT/US2020/016718
§ 371 (c)(1),
(2) Date: Aug. 3, 2021

(87) PCT Pub. No.: WO2020/163429
PCT Pub. Date: Aug. 13, 2020

(65) Prior Publication Data
US 2022/0106507 A1 Apr. 7, 2022

(51) Int. Cl.
*C09J 189/06* (2006.01)
*C08K 13/02* (2006.01)

(52) U.S. Cl.
CPC ............. *C09J 189/06* (2013.01); *C08K 13/02* (2013.01)

(58) Field of Classification Search
CPC ................................ C09J 189/06; C08K 13/02
See application file for complete search history.

(56) References Cited

U.S. PATENT DOCUMENTS

| 5,589,528 A | 12/1996 | Bogardy |
| 2004/0166231 A1 | 8/2004 | Ortiz De Zaratte |
| 2004/0166238 A1 | 8/2004 | Nowicki et al. |
| 2007/0281003 A1* | 12/2007 | Fuisz ............... A61K 9/006 424/443 |

(Continued)

FOREIGN PATENT DOCUMENTS

| DE | 10261786 | 7/2004 |
| DE | 10261786 A1 | 7/2004 |

(Continued)

OTHER PUBLICATIONS

Indian Patent Application No. 202117039804. First Examination Report dated Jan. 16, 2023.

(Continued)

*Primary Examiner* — Ling Siu Choi
*Assistant Examiner* — Andrea Wu
(74) *Attorney, Agent, or Firm* — Cislo & Thomas, LLP

(57) ABSTRACT

A biodegradable adhesive for use in at least one chosen from glue lap, case and carton seal, slower speed carton seal and bookbinding, the biodegradable adhesive including at least one chosen from:

| | % (Parts) |
|---|---|
| Water: | 35-50 |
| Defoamer: | .3-.8 |
| Gelatin: | 25-35 |
| Preservative: | .2-.5 |
| Glycerin: | 7-15 |
| Epsom Salt: | 10-20 |
| Vanilla Extract: | <1 |
| Total Parts: and | 100% |

(Continued)

-continued

| | % (Parts) |
|---|---|
| Water: | 33-45 |
| Defoamer: | .3-.8 |
| Gelatin: | 35-45 |
| Glycerin: | 15-27 |
| Preservative: | .2-.5 |
| Vanilla Extract: | <1 |
| Total: | 100%. |

12 Claims, 2 Drawing Sheets

(56) References Cited

U.S. PATENT DOCUMENTS

| 2012/0282335 A1 | 11/2012 | Venkatesh |
| 2014/0144579 A1 | 5/2014 | Brown et al. |
| 2014/0200193 A1 | 7/2014 | Garcia |
| 2015/0005174 A1 | 1/2015 | Tanaka et al. |
| 2017/0174958 A1 | 6/2017 | Yang et al. |
| 2018/0280304 A1 | 10/2018 | Uramatsu |
| 2021/0107263 A1 | 4/2021 | Bartolucci |
| 2023/0083844 A1 | 3/2023 | Thomas |

FOREIGN PATENT DOCUMENTS

| EP | 1462499 A1 | 9/2004 |
| GB | 2138823 | 10/1984 |
| JP | H10503519 | 3/1998 |
| WO | WO2005073331 | 8/2005 |
| WO | 2014163916 A1 | 10/2014 |
| WO | WO2014163916 | 10/2014 |
| WO | WO2020163429 | 8/2020 |

OTHER PUBLICATIONS

PCT/US21/41587. International Search Report dated Oct. 26, 2021.
PCT/US21/016451. International Search Report dated Jul. 1, 2021.
International Search Report and Written Opinion dated May 12, 2020 from counterpart International Patent Application No. PCT/US2020/16718.
Dorr et al., Bond Strength of Biodegradable Gelatin-Based Wood Adhesives, pp. 195-204, J. Renew. Mater., vol. 3, No. 3, Aug. 2015, Scrivener Publishing, LLC.
European Search Report dated Feb. 9, 2022 from counterpart European Patent Application No. 20752350.7.

\* cited by examiner

BIODEGRADABLE ADHESIVES

This application is the National Phase of International Application PCT/US2020/016718 filed Feb. 5, 2020 which designated the U.S.

This application claims priority to U.S. Provisional Patent Application No. 62/801,480 filed Feb. 5, 2019, which application is incorporated by reference herein in its entirety.

SUMMARY

Disclosed are natural based biodegradable adhesives. By being biodegradable, the these adhesives allow the materials with which they are used to be recyclable, repulpable and/or compostable, which can substantially increase the value of such materials once used, as well as provide a more green and more environmentally sustainable repurposing of the used materials.

A biodegradable adhesive for use in at least one chosen from glue lap, case and carton seal, slower speed carton seal and bookbinding, includes at least one chosen from:

|  | % (Parts) |
| --- | --- |
| Water: | 35-50 |
| Defoamer: | .3-.8 |
| Gelatin: | 25-35 |
| Preservative: | .2-.5 |
| Glycerin: | 7-15 |
| Epsom Salt: | 10-20 |
| Vanilla Extract: | <1 |
| Total Parts: | 100% | and

|  | % (Parts) |
| --- | --- |
| Water: | 33-45 |
| Defoamer: | .3-.8 |
| Gelatin: | 35-45 |
| Glycerin: | 15-27 |
| Preservative: | .2-.5 |
| Vanilla Extract: | <1 |
| Total: | 100%. |

DETAILED DESCRIPTION

Figure 1:
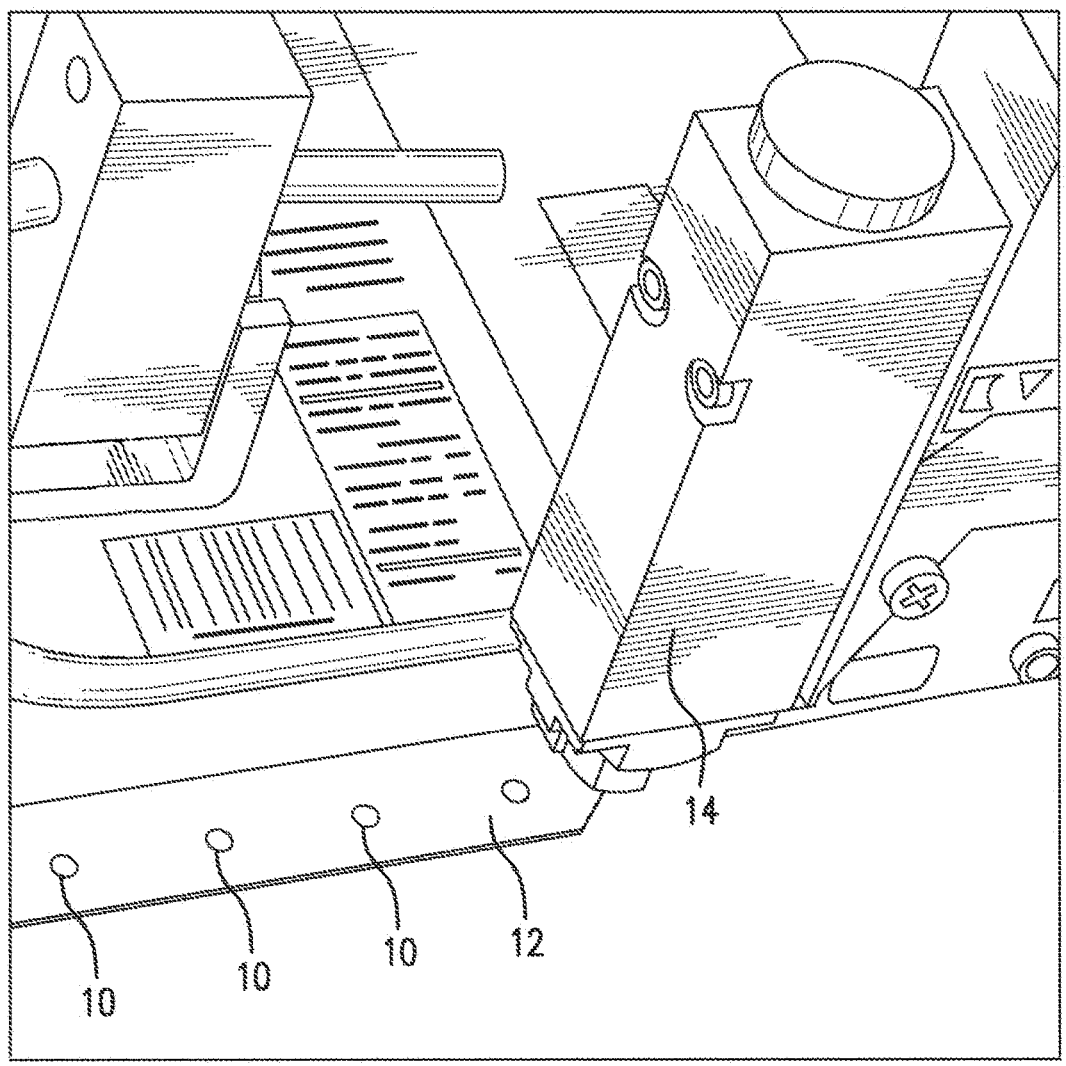
FIG. 1 shows dots of adhesive placed on a material substrate by a typical applicator.

The first basic adhesive is a natural gelatin (gelatine) based biodegradable adhesive as a substitute or replacement for non-biodegradable synthetic resin emulsion-based adhesives (aka, "cold glues").

Various aspects of the various adhesives and applications described below can be combined in different manners to create different embodiments.

I. First Basic Adhesive

The first basic adhesive can include water, pure or various blends of gelatins, glycerin, Epsom salt, defoamer, and preservative. The gelatins can include blends of amber and opaque colored inedible porcine, bovine, and bone extracted collagen based gelatins, and can also include pharmaceutical and edible gelatins as well. The gelatins can be presented in various forms, including as granulated, noodles, dust, natural colored hard shell pharmaceutical capsule gelatin tailings, ground multi-colored hard shell pharmaceutical capsule gelatin tailings, and various pharmaceutical soft gelatin encapsulation web netting encapsulation waste gelatin tailings blends.

The glycerin can include 99.7% USP Kosher Grade, as well as lesser quality and lower priced grades, including 96.0% technical grade and 88% crude grade. The defoamer can be Solvay USA defoamer. The preservative prevents mold. Vanilla extract can be added to the first basic adhesive to provide a pleasant odor. All of the components can be provided in edible form to make an entirely edible product.

One basic formula for the first basic adhesive includes:

|  | % (Parts) |
| --- | --- |
| Water: | 35-50 |
| Defoamer: | .3-.8 |
| Gelatin: | 25-35 |
| Preservative: | .2-.5 |
| Glycerin: | 7-15 |
| Epsom Salt: | 10-20 |
| Vanilla Extract: | <1 |
| Total Parts: | 100% |

The specific percentages of components can be adjusted as necessary depending on a specific use and desired characteristic. All values and ranges within the given ranges are intended to be part of the invention.

One specific formula for the first basic adhesive (as represented by an adhesive sold under the name of Cooler-Melt 999™) includes:

|  | % (Parts) |
| --- | --- |
| Water: | 43.900 |
| Defoamer: | .640 |
| Gelatin: | 29.057 |
| Preservative: | .363 |
| Glycerin: | 11.550 |
| Epsom Salt: | 14.240 |
| Vanilla Extract: | .250 |
| Total Parts: | 100.000% |

This specific formula for the first basic adhesive provides an adhesive with the following properties:

Physical State: Solid Gel

Viscosity Specification: 800-1,100 cps. W/0% Dilution @ 700 C #6 @ 20 RPM's; BROOKFIELD RVT Viscometer Refracted Solids %: 55.75%+/−3%

Odor: Pleasant, mild vanilla.

Color: Varies widely due to the use of recycled collagens.

Solubility In Water: Soluble

Boiling Point: >212° F. (>100° C.) Water

Freezing Point: <32° F. (<0° C.) Water

Vapor Density (mmHg): N/A

Density: 1.19

Recommended Application Temperature: 60° C.-70° C. (could vary slightly)

Shelf-Life: Stored properly in a cool dry environment, 24-months.

Packaging: Gaylord Bulk Box filled with EZ-Loaf packages. Layered loafs. Poly sheets between layers. Each Gaylord Box weighs approximately 2,250 pounds.

Description: Biodegradable corrugated/folding carton paperboard sealing adhesive. Replaces non-biodegradable hot melt adhesives, cold glues, & pressure-sensitive tapes.

Alternatives to this specific formula can be provided as follows:

|  | % (Parts) |
| --- | --- |
| First alternative: | |
| Water: | 43.900 ± 5% |
| Defoamer: | .640 ± 5% |
| Gelatin: | 29.057 ± 5% |
| Preservative: | .363 ± 5% |
| Glycerin: | 11.550 ± 5% |
| Epsom Salt: | 14.240 ± 5% |
| Vanilla Extract: | .250 ± 5% |
| Total Parts: | 100.000% |
| Second alternative: | |
| Water: | 43.900 ± 2% |
| Defoamer: | .640 ± 2% |
| Gelatin: | 29.057 ± 2% |
| Preservative: | .363 ± 2% |
| Glycerin: | 11.550 ± 2% |
| Epsom Salt: | 14.240 ± 2% |
| Vanilla Extract: | .250 ± 2% |
| Total Parts: | 100.000% |

Other alternatives can also be provided by varying the percentages of components.

The first basic adhesive can be gently gravity filtered through a twin 200-micron & 55-micron filter bag system.

This adhesive can be produced in food processing hemispherical bottom mixing kettles (super-mix, no mix dead spots), which provide superior mixing as compared to conventional adhesive production kettles having cone shaped or flat bottoms.

Application equipment involving applications 1-3 below may need to be modified to be non-corrosive in the presence of water (i.e., use of stainless steel, coated and/or other non-corrosive types of pumps, screws, modified lids for water drip-down evaporation, valves, heads and nozzles, etc. Also, the glycerin in the composition lubricates adhesive supply unit components, including O-rings. This first basic adhesive has shown an increased heat tolerance.

Applications

1. Glue Lap

A first specific application of the first basic adhesive is as a glue lap for glue lap seam corrugated and solid paperboard Folding Cartons/Boxes converter gluing/finishing to manufacture corrugated boxes and folding solid paperboard Cartons and/Boxes. Cold glues are predominately used today as glue lap adhesives and are not biodegradable.

In this application, the first basic adhesive can be applied by Roller/wheel, various forms of spraying, extruded dots, stitches, beads, etc. This can include hot melt tank units, heated hoses, and heated glue extrusion heads (beads, stitches, dots, etc.). In some cases, heated open glue pots with glue application wheels/rollers can be used to apply the first basic adhesive to the corrugated inner lap seam. Valco/Melton of Cincinnati is a market leader in corrugated adhesives application equipment, and has tested and approved the first basic adhesive in their adhesive application equipment.

FIG. 1 shows dots of adhesive 10 placed on a material substrate 12 by a typical applicator 14.

The adhesive sticks corrugated and solid paperboard by losing water into the substrates and cooling (loss of temperature, applied at approximately 140° F./60° C. This is compared to conventional cold glues that are applied at room temperature and bond to corrugated and solid paperboard by losing water into the substrates.

As advantages in this glue lap application, the first basic adhesive is biodegradable and is freeze/thaw stable. That is, the adhesive can go through freeze/thaw cycles without substantive degradation. This means that the adhesive does not need to be shipped by heated trucks during winter conditions, a substantial cost savings, and/or, can be shipped year-round, and not just during warmer months. In addition, the adhesive has easy clean-up properties with hot (approximately) 160° F. water. No solvents or caustic chemical cleaners are required.

This adhesive can be used to internally and externally seal encapsulated pharmaceuticals and nutritional supplements folding cartons, and can use, essentially, waste gelatin capsules to safely seal the encapsulated products packaged in folding cartons.

2. Case and Carton Seal

A second specific application of the first basic adhesive is as an adhesive for corrugated box and solid paperboard folding carton and or box sealing, commonly referred to as a case-seal adhesive. Applications of such case-seal adhesives are in the sealing of tops and bottoms of cereal boxes, as well as the sealing of the tops and bottoms of the corrugated boxes that the cereal boxes get packed in. Hot melt adhesives are predominately used today as case-seal adhesives and are not biodegradable.

The first basic adhesive can be applied in this case-seal application in the same manner as in the glue lap application.

The adhesive sticks corrugated and solid paperboard by losing water into the substrates and cooling (loss of temperature, applied at approximately 140° F./60° C. This is compared to conventional hot melt adhesives that are applied at approximately 250-350° F. and bond by surrounding surface fibers and cooling (loss of temperature).

The first basic adhesive in this case-seal application provides the same advantages as discussed above with respect to the glue lap application. In addition, it also provides stronger, deeper, fiber-tearing bonds, and energy conservation, as the typical EVA-based case seal hot melt adhesives require approximately 50% more energy to apply versus application of the first basic adhesive in this case-seal application. Further, the lower temperature of application advances worker safety by curtailing serious skin burns and reducing lost-time accidents due to skin burns. Also, the first basic adhesive in this application provides improved adhesion in the presence of oil vapors, improved heat resistance bonds versus the EVA-based hot melt adhesives and is unconditionally repulpable.

3. Slower Speed Case Seal

A third specific application of the first basic adhesive is as an adhesive for replacement of non-biodegradable corrugated box sealing tapes, plastic corrugated banding materials, stretch wrap, and staples to seal the tops and bottoms of corrugated boxes.

The first basic adhesive can be applied in this case seal application in the same manner as in the glue lap application.

The adhesive sticks corrugated and solid paperboard by losing water into the substrates and cooling (loss of temperature, applied at approximately 140° F./60° C.

The first basic adhesive in this case seal application provides the same advantages as discussed above with respect to the glue lap application. In addition, it also provides stronger, deeper, fiber tearing bonds and problem resolution to widespread tape use related adhesion failure. It can replace pressure sensitive tapes which do not stick well below 30° F. It is unconditionally repulpable and saves money over the use of sealing tapes, plastic corrugated banding materials, stretch wrap, and staples.

Testing

The first basic adhesive (Cooler Melt 999™) has been tested for strength with respect to construction of a pork box. Below are the results of three tests using the noted adhesives, where Test 1 was directed to use of Cooler Melt 999™ only; Test 2 was directed to use of a conventional (plastic/petroleum) hot melt adhesive and Test 3 was directed to a mixture of the Cooler Melt 999™ and the conventional hot melt adhesive. In the tests, the "Compress" and "Deflect" measurements are an indicator of the ability of the box to protect contents, with a higher "Compress" value being better and a lower "Deflect" value being better. The mixture of Test 3 provides for high speed of the line but the material is not biodegradable because of the inclusion of the conventional hot melt adhesive. This mixture also shows the highest compression and lowest deflection combination of the 3 tests.

| TEST 1: | |
|---|---|
| Product ID: | Pork Box |
| Sample ID: | Cooler Melt 999 ™ (biodegradable) |
| Box Style: | Die-Cut |

| EDGE CRUSH TEST (lbf/in), T839 | |
|---|---|
| 1 | 61.1 |
| 2 | 61.5 |
| 3 | 59.1 |
| 4 | 59.1 |
| 5 | 58.3 |
| 6 | 58.5 |
| Average | 59.6 |
| Std Dev | 1.36 |

| COMPRESSION (lbf), T804; Condition: 73° F./50% RH; Orientation: Top-to-Bottom | | |
|---|---|---|
| | Compress (lbf) | Deflect (in) |
| 1 | 1900 | 0.54 |
| 2 | 1607 | 0.47 |
| 3 | 1856 | 0.47 |
| 4 | 1926 | 0.61 |
| 5 | 1810 | 0.52 |
| Average | 1820 | 0.52 |
| Std Dev | 126.7 | 0.055 |
| COV (%) | 7.0% | |

Note: The second sample above was misshapen when erected. The short end wall was not completely. This likely contributed to the lower peak compressive force.

Figure 2:
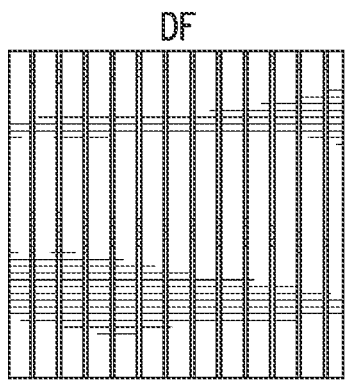
FIG. 2 shows adhesive lines used during testing of the first basic adhesive.
Figure 2:
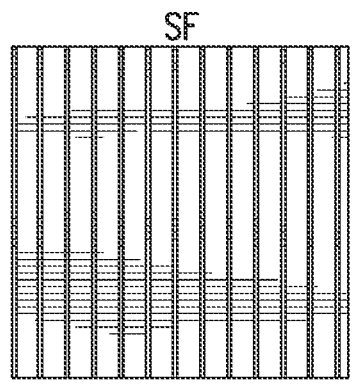

| GLUE LINES: See FIG. 2. | | |
|---|---|---|
| Liner | Width (in.) | Condition |
| Double Back | 0.05 | GOOD, NO Breaks |
| Single Face | 0.06 | GOOD, NO Breaks |

| TEST 2: | |
|---|---|
| Product ID: | Pork Box |
| Sample ID: | Conventional Hot Melt Only (not biodegradable) |
| Box Style: | Die-Cut |

| EDGE CRUSH TEST (lbf/in), T839 | |
|---|---|
| 1 | 58.3 |
| 2 | 58.4 |
| 3 | 60.0 |
| 4 | 59.1 |
| 5 | 57.8 |
| 6 | 58.1 |
| Average | 58.6 |
| Std Dev | 0.80 |

| COMPRESSION (lbf), T804; Condition: 73° F./50% RH; Orientation: Top-to-Bottom | | |
|---|---|---|
| | Compress (lbf) | Deflect (in) |
| 1 | 2106 | 0.62 |
| 2 | 1853 | 0.57 |
| 3 | 1896 | 0.65 |
| 4 | 1718 | 0.66 |
| 5 | 1696 | 0.60 |
| Average | 1854 | 0.62 |
| Std Dev | 164.9 | 0.035 |
| COV (%) | 8.9% | |

Figure 3:
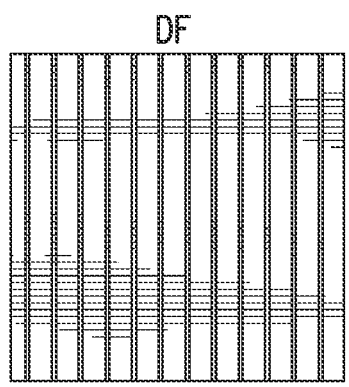
FIG. 3 shows adhesive lines used during testing of a conventional hot melt adhesive.
Figure 3:
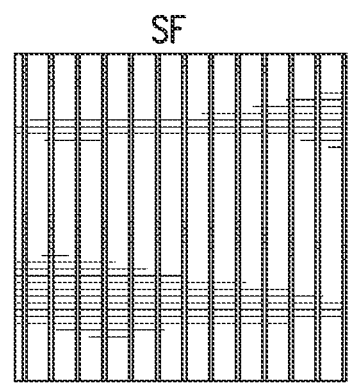

| GLUE LINES: See FIG. 3. | | |
|---|---|---|
| Liner | Width (in.) | Condition |
| Double Back | 0.06 | GOOD, No Breaks |
| Single Face | 0.07 | GOOD, No Breaks |

| TEST 3: | |
|---|---|
| Product ID: | Pork Box |
| Sample ID: | Conventional Hot Melt and Cooler Melt 999 ™ Mixture (not biodegradable) |
| Box Style: | Die-Cut |

| EDGE CRUSH TEST (lbf/in), T839 | |
|---|---|
| 1 | 58.3 |
| 2 | 59.2 |
| 3 | 56.0 |
| 4 | 60.0 |
| 5 | 58.8 |
| 6 | 56.9 |
| Average | 58.2 |
| Std Dev | 1.49 |

| COMPRESSION (lbf), T804; Condition: 73° F./50% RH; Orientation: Top-to-Bottom | | |
|---|---|---|
| | Compress (lbf) | Deflect (in) |
| 1 | 1883 | 0.58 |
| 2 | 1948 | 0.61 |
| 3 | 1925 | 0.59 |
| 4 | 1883 | 0.52 |
| 5 | 1900 | 0.54 |
| Average | 1908 | 0.57 |
| Std Dev | 28.3 | 0.036 |
| COV(%)1.5% | | |

Figure 4:
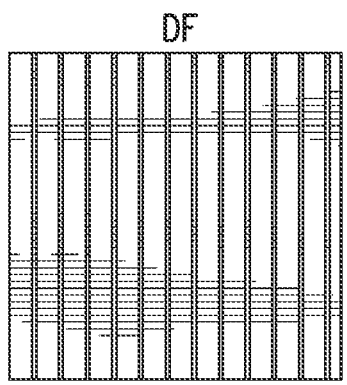
FIG. 4 shows adhesive lines used during testing of a mixture of a conventional hot melt adhesive and the first basic adhesive.
Figure 4:
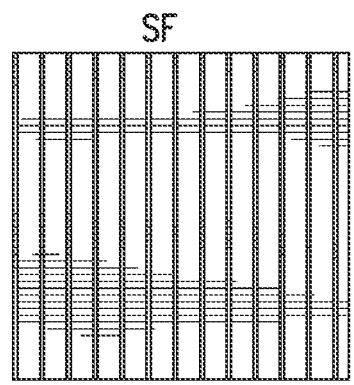

| GLUE LINES: See FIG. 4. | | |
|---|---|---|
| Liner | Width (in.) | Condition |
| Double Back | 0.05 | GOOD, No Breaks |
| Single Face | 0.07 | GOOD, No Breaks |

II. Second Basic Adhesive

The second basic adhesive can include water, pure or various blends of gelatins, glycerin, defoamer, and preservative. The gelatins can include blends of amber and opaque colored inedible porcine, bovine, and bone extracted collagen based gelatins, and can also include pharmaceutical and edible gelatins as well. The gelatins can be presented in various forms, including as granulated, noodles, dust, natural colored hard shell pharmaceutical capsule gelatin tailings, ground multi-colored hard shell pharmaceutical capsule gelatin tailings, and various pharmaceutical soft gelatin encapsulation web netting encapsulation waste gelatin tailings blends.

The glycerin can include 99.7% USP Kosher Grade, as well as lesser quality and lower priced grades, including 96.0% technical grade and 88% crude grade. The defoamer can be Solvay USA defoamer. The preservative prevents mold. Vanilla extract can be added to the first basic adhesive to provide a pleasant odor.

One basic formula for the second basic adhesive includes:

|  | % (Parts) |
| --- | --- |
| Water: | 33-45 |
| Defoamer: | .3-.8 |
| Gelatin: | 35-45 |
| Glycerin: | 15-27 |
| Preservative: | .2-.5 |
| Vanilla Extract: | <1 |
| Total: | 100% |

The specific percentages of components can be adjusted as necessary depending on a specific use and desired characteristic. All values and ranges within the given ranges are intended to be part of the invention.

One specific formula for the second basic adhesive (as represented by an adhesive sold under the name of Bio-Bond 1230™) includes:

|  | % (Parts) |
| --- | --- |
| Water: | 38.900 |
| Defoamer: | .670 |
| Gelatin: | 38.080 |
| Glycerin: | 21.700 |
| Preservative: | .380 |
| Vanilla Extract: | .270 |
| Total: | 100.000% |

This specific formula for the second basic adhesive provides an adhesive with the following properties:

Physical State: Solid Gel
Viscosity Specification: 4,250-4,950 cps. W/0% Dilution @ 700 C #6 @ 20 RPM's BROOKFIELD RVT Viscometer
Recommended Application Temp.: 60°-70° C. (point of Binder Glue wheel/roller release to substrate)
Recommended Application Mil: 12-31 Mils (0.7874 mm) or less as needed.
Refracted Solids %: 63%+/−3%
Odor: Pleasant, mild vanilla.
Color: Variable opaque multi-colored (varies due to collagen sourcing)
Solubility In Water: Soluble
Boiling Point: >212° F. (>100° C.) Water
Freezing Point: <32° F. (<0° C.) Water
Vapor Density (mmHg): N/A
Density: 1.19
Shelf-Life: Stored properly in a cool dry environment, 24-months.
Packaging: Gaylord Bulk Box filled with EZ-Loaf packages. Layered loafs. Approximately 3.75 pounds each. Poly sheets between layers. Each Gaylord Box weighs approximately 2,250 pounds.
Description: Biodegradable—Repulpable Premium Quality one (1) SHOT HARRIS-SHERIDAN-KOLBUS-MULLER-MARTINI PERFECT BINDER Spine Adhesive. Strong tack, fast set speed, pliable film, clean machining, shows good page pull adhesion and flex test values to ground wood uncoated paper stock.

Alternatives to this specific formula can be provided as follows:

|  | % (Parts) |
| --- | --- |
| First alternative: | |
| Water: | 38.900 ± 5% |
| Defoamer: | .670 ± 5% |
| Gelatin: | 38.080 ± 5% |
| Glycerin: | 21.700 ± 5% |
| Preservative: | .380 ± 5% |
| Vanilla Extract: | .270 ± 5% |
| Total: | 100.000% |
| Second alternative: | |
| Water: | 38.900 ± 2% |
| Defoamer: | .670 ± 2% |
| Gelatin: | 38.080 ± 2% |
| Glycerin: | 21.700 ± 2% |
| Preservative: | .380 ± 2% |
| Vanilla Extract: | .270 ± 2% |
| Total: | 100.000% |

Other alternatives can also be provided by varying the percentages of components.

This adhesive can be gently gravity filtered through a twin 400-micron and 200-micron filter bag system.

Applications

4. Spine Glue

The second basic adhesive provides a replacement adhesive for non-biodegradable perfect binding hot melt spine adhesives, for use on perfect binding equipment and spine gluing equipment (wheel/roller application) involving ground wood paper stocks for crossword, puzzle, coloring and other types of books.

The second basic adhesive in this application can be applied via wheel and roller application using an open heated pot, such as used on Harris Perfect Binder Machine, Muller Martini, Kolbus, and other perfect binding and spine gluing equipment.

The second basic adhesive in this application is biodegradable and provides stronger, deeper, fiber-tearing bonds. It also provides energy conservation, as the typical EVA-based case seal hot melt adhesives require approximately 50% more energy to apply versus application of the first basic adhesive in this case-seal application. Further, the lower temperature of application advances worker safety by curtailing serious skin burns. Also, the first basic adhesive in this application provides improved adhesion in the presence of oil vapors, improved heat resistance bonds versus the EVA-based hot melt adhesives and is unconditionally repulpable. It provides doubled their waste paper value (versus hot melt adhesives contaminated paper). It saves money through these advantages. It also provides improved page pull & flex test results, as well as improved layflat (reader-friendly, diminished mousetrapping (when you open the book it snaps shut)) quality properties. It has been found that this adhesive doesn't rope off the application wheel, because of the inclusion of strong gelatin with added water content, and also because of the noted filtration.

Softcover books can be produced with a single application of the second basic adhesive at a viscosity of less than 5,000 cps. (Brookfield Viscometer Model RVT 20 RPM's at 70 C).

In one version of the second basic adhesive, high strength inedible pharma/edible waste gelatins can be blended with added water in conjunction with 99.7% USP Kosher grade glycerin at levels that exceed 20% (of the 100% total composition). Such a blend produces deeper book backbone fiber penetration, resulting in stronger bonds. This also produces improved lay flat easier-read book products with added film flexibility properties. This is a substantial improvement over current, plastic based non-biodegradable spine glues, which are stiff and cause mouse trapping.

With one or both of the first and second basic adhesives discussed above, the adhesives may require longer set-up times than typical wax/plastic adhesives. Where a typical wax/plastic adhesive may set up in 1-2 seconds, the first and second basic adhesives may need approximately 5 seconds to set up. This longer time may be accommodated by adding additional length of compression belts in a compression line to extend the time of compression to that necessary for set up. Alternatively, or in addition thereto, it has been found that using a slot die applicator, which extrudes a flat film of adhesive onto the material, without a roller, allows water from the adhesive to evaporate quicker to allow the adhesive to set up within the desired time, such as 2 seconds. Controlled fiberization swirl spray adhesive application can also be used.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all ranges within the given range. To the extent that "about" or "substantively" is used to modify a value, that value is rendered as ±10% and ±2% of the value, respectively, unless otherwise stated.

The invention claimed is:

1. A biodegradable adhesive for use in at least one chosen from glue lap, case and carton seal, slower speed carton seal and bookbinding, the biodegradable adhesive consisting of:

| | in percent by weight |
|---|---|
| Water: | 35-50 |
| Defoamer: | .3-.8 |
| Gelatin: | 25-35 |
| Preservative: | .2-.5 |
| Glycerin: | 7-15 |
| Epsom Salt: | 10-20 |
| Vanilla Extract: | less than 1%. |

2. The biodegradable adhesive of claim 1, wherein the biodegradable adhesive consists of:

| | in percent by weight |
|---|---|
| Water: | 43.900 ± 5% |
| Defoamer: | .640 ± 5% |
| Gelatin: | 29.057 ± 5% |
| Preservative: | .363 ± 5% |
| Glycerin: | 11.550 ± 5% |
| Epsom Salt: | 14.240 ± 5% |
| Vanilla Extract: | 0.250 ± 5%. |

3. The biodegradable adhesive of claim 1, wherein the biodegradable adhesive consists of:

| | in percent by weight |
|---|---|
| Water: | 43.900 ± 2% |
| Defoamer: | .640 ± 2% |
| Gelatin: | 29.057 ± 2% |
| Preservative: | .363 ± 2% |
| Glycerin: | 11.550 ± 2% |
| Epsom Salt: | 14.240 ± 2% |
| Vanilla Extract: | 0.250 ± 2%. |

4. The biodegradable adhesive of claim 1, wherein the biodegradable adhesive consists of:

| | in percent by weight |
|---|---|
| Water: | 43.900 |
| Defoamer: | .640 |
| Gelatin: | 29.057 |
| Preservative: | .363 |
| Glycerin: | 11.550 |
| Epsom Salt: | 14.240 |
| Vanilla Extract: | 0.250. |

5. A biodegradable adhesive consisting of:

| | in percent by weight |
|---|---|
| Water: | 33-45 |
| Defoamer: | .3-.8 |
| Gelatin: | 35-45 |
| Glycerin: | 15-27 |
| Preservative: | .2-.5 |
| Vanilla Extract: | less than 1. |

6. The biodegradable adhesive of claim 5, wherein the biodegradable adhesive consists of:

| | in percent by weight |
|---|---|
| Water: | 38.900 ± 5% |
| Defoamer: | .670 ± 5% |
| Gelatin: | 38.080 ± 5% |
| Glycerin: | 21.700 ± 5% |

-continued

| | in percent by weight |
|---|---|
| Preservative: | .380 ± 5% |
| Vanilla Extract: | 0.270 ± 5%. |

7. The biodegradable adhesive of claim 5, wherein the biodegradable adhesive consisting of:

| | in percent by weight |
|---|---|
| Water: | 38.900 ± 2% |
| Defoamer: | .670 ± 2% |
| Gelatin: | 38.080 ± 2% |
| Glycerin: | 21.700 ± 2% |
| Preservative: | .380 ± 2% |
| Vanilla Extract: | 0.270 ± 2%. |

8. The biodegradable adhesive of claim 5, wherein the biodegradable adhesive consists of:

| | in percent by weight |
|---|---|
| Water: | 38.900 |
| Defoamer: | .670 |
| Gelatin: | 38.080 |
| Glycerin: | 21.700 |

-continued

| | in percent by weight |
|---|---|
| Preservative: | .380 |
| Vanilla Extract: | 0.270. |

9. A method of using a biodegradable adhesive, comprising:
providing the biodegradable adhesive of claim 1;
applying the biodegradable adhesive to a substrate.

10. The method of claim 9, comprising:
applying the biodegradable adhesive to the substrate using a slot die applicator, to extrude a flat film of adhesive onto the substrate to reduce time for evaporation of water from the biodegradable adhesive, thereby reducing set-up time for the biodegradable adhesive.

11. A method of using a biodegradable adhesive, comprising:
providing the biodegradable adhesive of claim 5;
applying the biodegradable adhesive to a substrate.

12. The method of claim 11, comprising:
applying the biodegradable adhesive to the substrate using a slot die applicator, to extrude a flat film of adhesive onto the substrate to reduce time for evaporation of water from the biodegradable adhesive, thereby reducing set-up time for the biodegradable adhesive.

* * * * *